United States Patent
Chen et al.

(10) Patent No.: US 9,923,390 B2
(45) Date of Patent: Mar. 20, 2018

(54) METHOD AND APPARATUS FOR PERFORMING CHARGING PORT DETECTION CONTROL

(71) Applicant: MEDIATEK INC., Hsin-Chu (TW)

(72) Inventors: Pi-Fen Chen, Hsinchu County (TW); Chieh-Wei Liao, New Taipei (TW)

(73) Assignee: MediaTek Inc., Hsin-Chu (TW)

( * ) Notice: Subject to any disclaimer, the term of this patent is extended or adjusted under 35 U.S.C. 154(b) by 62 days.

(21) Appl. No.: 14/824,098

(22) Filed: Aug. 12, 2015

(65) Prior Publication Data

US 2015/0349552 A1 Dec. 3, 2015

Related U.S. Application Data

(62) Division of application No. 13/610,903, filed on Sep. 12, 2012, now Pat. No. 9,142,982.

(60) Provisional application No. 61/559,243, filed on Nov. 14, 2011.

(51) Int. Cl.
*H02J 7/00* (2006.01)

(52) U.S. Cl.
CPC .......... *H02J 7/0036* (2013.01); *H02J 7/0021* (2013.01); *H02J 7/0057* (2013.01); *H02J 2007/0062* (2013.01); *H02J 2007/0096* (2013.01)

(58) Field of Classification Search
CPC ...... H02J 7/0057; H02J 7/0021; H02J 7/0096; H02J 7/0062; H02J 7/0036
See application file for complete search history.

(56) References Cited

U.S. PATENT DOCUMENTS

| | | |
|---|---|---|
| 7,624,202 B2 | 11/2009 | Monks |
| 7,631,111 B2 | 12/2009 | Monks |
| 7,782,022 B2 | 8/2010 | Xu |
| 8,352,644 B2 | 1/2013 | Malamant |
| 8,362,741 B2 | 1/2013 | Capella |

(Continued)

FOREIGN PATENT DOCUMENTS

| | | |
|---|---|---|
| CN | 1116462 A | 2/1996 |
| CN | 101286646 A | 10/2008 |

(Continued)

*Primary Examiner* — Naum B Levin
(74) *Attorney, Agent, or Firm* — Wolf, Greenfield & Sacks, P.C.

(57) ABSTRACT

A method and an apparatus for performing charging port detection control are provided, where the method is applied to an electronic device, and a communication port of the electronic device has a functionality of obtaining power from an external power source for the electronic device. The method may include the steps of: detecting whether an output voltage level of a battery of the electronic device reaches a predetermined threshold value; and control operation(s) according to whether the output voltage level reaches the predetermined threshold value. For example, the method may include: when it is detected that the output voltage level is less than the predetermined threshold value, pre-charging the battery with a predetermined pre-charging current level to make the output voltage level reach the predetermined threshold value, and then controlling a detection path switching unit to electrically connect data terminal(s) of the communication port to a charging port detection circuit.

20 Claims, 3 Drawing Sheets

(56) References Cited

U.S. PATENT DOCUMENTS

| | | |
|---|---|---|
| 8,533,499 B2 | 9/2013 | Murakami |
| 9,148,026 B2* | 9/2015 | Gagne ................. H02J 7/00 |
| 9,336,170 B2* | 5/2016 | Hong ................. G06F 13/385 |
| 2003/0122523 A1 | 7/2003 | Kim et al. |
| 2008/0042616 A1* | 2/2008 | Monks ................. H04L 12/10 |
| | | 320/106 |
| 2008/0054855 A1 | 3/2008 | Hussain et al. |
| 2008/0258688 A1 | 10/2008 | Hussain |
| 2010/0070659 A1 | 3/2010 | Ma |
| 2010/0073837 A1* | 3/2010 | Predtetchenski ... G06F 13/4072 |
| | | 361/91.5 |
| 2010/0270862 A1 | 10/2010 | Miyanaga et al. |
| 2011/0057604 A1 | 3/2011 | Capella |
| 2011/0145445 A1* | 6/2011 | Malamant ............. G06F 1/3203 |
| | | 710/16 |
| 2011/0239029 A1 | 9/2011 | Murakami |
| 2011/0279095 A1* | 11/2011 | Hong ................. G06F 13/385 |
| | | 320/164 |
| 2012/0119696 A1 | 5/2012 | Picard |
| 2012/0166173 A1 | 6/2012 | Fischbach |
| 2013/0038274 A1 | 2/2013 | Forsythe |
| 2013/0082662 A1* | 4/2013 | Carre ................... H02J 7/0052 |
| | | 320/134 |
| 2013/0113414 A1 | 5/2013 | Chen |
| 2013/0113415 A1 | 5/2013 | Chen |
| 2016/0306767 A1* | 10/2016 | Considine ........... G06F 13/4081 |

FOREIGN PATENT DOCUMENTS

| | | |
|---|---|---|
| CN | 101677187 A | 3/2010 |
| CN | 102064570 A | 5/2011 |
| CN | 102104259 A | 6/2011 |
| CN | 102195299 A | 9/2011 |
| JP | 63273102 A | 11/1988 |
| TW | 201117518 | 5/2011 |
| TW | M412544 | 9/2011 |
| TW | M428512 | 5/2012 |

* cited by examiner

METHOD AND APPARATUS FOR PERFORMING CHARGING PORT DETECTION CONTROL

CROSS REFERENCE TO RELATED APPLICATIONS

This application is a divisional application and claims the benefit of U.S. non-provisional application Ser. No. 13/610,903, which was filed on Sep. 12, 2012, now U.S. Pat. No. 9,142,982, issued on Sep. 22, 2015, and is incorporated herein by reference. The U.S. non-provisional application Ser. No. 13/610,903 claims the benefit of U.S. Provisional Application No. 61/559,243, which was filed on Nov. 14, 2011.

BACKGROUND

The present invention relates to control of a charging port of an electronic device, and more particularly, to a method for performing charging port detection control, and to an associated apparatus.

A portable electronic device equipped with batteries (e.g., a multifunctional mobile phone, a personal digital assistant (PDA), a tablet, etc) can be very convenient to a user. According to the related art, the portable electronic device may be designed to have a Universal Serial Bus (USB) port, and the user can electrically connect the portable electronic device to an electronic device complying with USB standards through the USB port when needed, or charge the portable electronic device (more particularly, the battery thereof) with a power source temporarily connected to the USB port, where the power source can be a USB charger, or can be a personal computer (PC) since the USB port of the portable electronic device can obtain power from the power source through the USB port. In a situation where high-speed USB signaling is required, some problems may occur. For example, the portable electronic device may suffer from noise due to improper control. In another example, the portable electronic device may suffer from an unwanted leakage current due to improper control. Thus, a novel method is required for enhancing USB port control of an electronic device.

SUMMARY

It is therefore an objective of the claimed invention to provide a method for performing charging port detection control, and to provide an associated apparatus, in order to solve the above-mentioned problems.

An exemplary embodiment of a method for performing charging port detection control is provided, where the method is applied to an electronic device, and a communication port of the electronic device has a functionality of obtaining power from an external power source for the electronic device. The method comprises the steps of: detecting whether an output voltage level of a battery of the electronic device reaches a first predetermined threshold value; and when it is detected that the output voltage level of the battery is less than the first predetermined threshold value, obtaining power from the external power source through a charger module of the electronic device to make the output voltage level of the battery reach the first predetermined threshold value or to make a system voltage of the electronic device be larger than a second predetermined threshold value, and then performing charging port detection on the communication port, wherein the system voltage corresponds to a system power terminal providing a system power to a system circuit of the electronic device.

An exemplary embodiment of an apparatus for performing charging port detection control is provided, where the apparatus comprises at least one portion of an electronic device, and a communication port of the electronic device has a functionality of obtaining power from an external power source for the electronic device. The apparatus comprises a charging port detection circuit, a detection path switching unit, and a charger module. The charging port detection circuit is arranged to perform charging port detection, and the detection path switching unit is arranged to control electrical connection between the communication port and the charging port detection circuit. In addition, the charger module is arranged to detect whether an output voltage level of a battery of the electronic device reaches a first predetermined threshold value. Additionally, when it is detected that the output voltage level is less than the first predetermined threshold value, the charger module obtains power from the external power source to make the output voltage level reach the first predetermined threshold value or to make a system voltage of the electronic device be larger than a second predetermined threshold value, and then the detection path switching unit electrically connects at least one data terminal of the communication port to the charging port detection circuit, allowing the charging port detection circuit to perform the charging port detection on the at least one data terminal, wherein the system voltage corresponds to a system power terminal providing a system power to a system circuit of the electronic device.

An exemplary embodiment of a method for performing charging port detection control is provided, where the method is applied to an electronic device comprising a physical layer circuit. The method comprises enabling a power supply for supplying power to the physical layer circuit, and then performing charging port detection on a communication port of the electronic device.

An exemplary embodiment of an apparatus for performing charging port detection control is provided, where the apparatus comprises at least one portion of an electronic device, and a communication port of the electronic device has a functionality of obtaining power from an external power source for the electronic device. The apparatus comprises a charging port detection circuit, a detection path switching unit, and a physical layer circuit of the electronic device. The charging port detection circuit is arranged to perform charging port detection, and the detection path switching unit is arranged to control electrical connection between the communication port and the charging port detection circuit. In addition, the apparatus enables a power supply for supplying power to the physical layer circuit, and then the charging port detection circuit performs the charging port detection on the communication port of the electronic device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
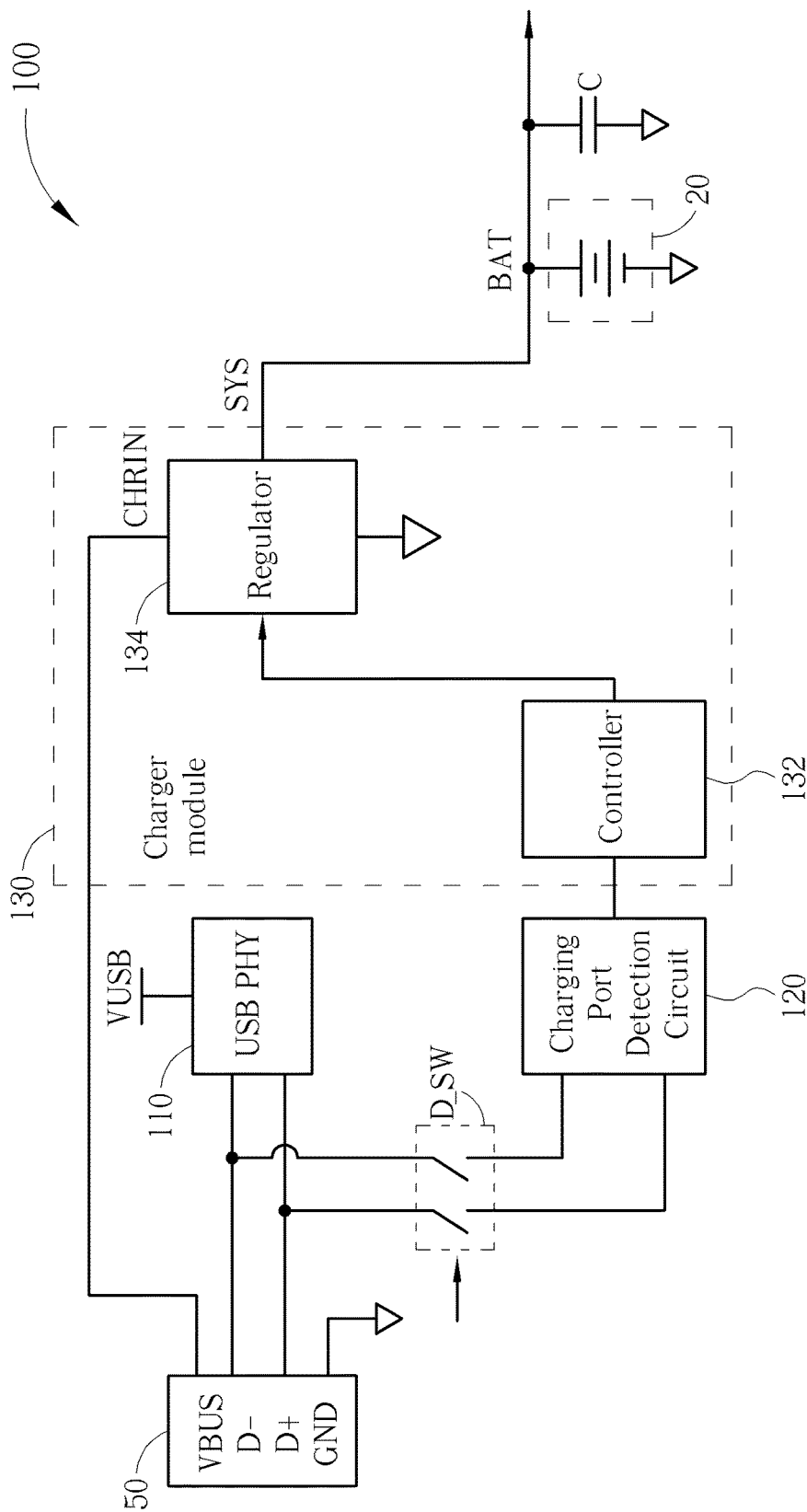
FIG. 1 is a diagram of an apparatus for performing charging port detection control according to a first embodiment of the present invention.

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The present invention proposes an adequate startup flow and an associated apparatus for battery charging, which comply with battery charging specifications such as BC1.1 specification and BC1.2 specification (i.e. Revision 1.1 and Revision 1.2 of Battery Charging (BC) Specifications, respectively). When an external power source is attached, the startup flow first detects whether an output voltage of a battery equipped in the electronic device is high enough (i.e., whether the battery voltage reaches a first predetermined threshold value VTH1). When it is detected that the output voltage of the battery is less than the first predetermined threshold value VTH1, power from the external power source is drawn to make the output voltage of the battery reach the first predetermined threshold value VTH1 or to make a system voltage of the electronic device be larger than a second predetermined threshold value VTH2. When the output voltage of the battery or the system voltage is high enough to enable a power supply for supplying a physical layer circuit of the electronic device, the startup flow then enters the charging port detection step, distinguishing the type of the charging port/communication port of the external power source. By properly arranging the timing of enabling/disabling the physical layer circuit, the timing of enabling/disabling the system circuit and the timing of performing the charging port detection, the problems encountered by the conventional charging port control can be reduced or eliminated.

Following takes Universal Serial Bus (USB) devices as an example. Please refer to FIG. 1, which illustrates a diagram of an apparatus 100 for performing charging port detection control according to a first embodiment of the present invention. According to different embodiments, such as the first embodiment and some variations thereof, the apparatus 100 may comprise at least one portion (e.g. a portion or all) of an electronic device. For example, the apparatus 100 may comprise a portion of the electronic device mentioned above, and more particularly, can be a control circuit such as an integrated circuit (IC) within the electronic device. In another example, the apparatus 100 can be the whole of the electronic device mentioned above. In another example, the apparatus 100 can be an audio/video system comprising the electronic device mentioned above. Examples of the electronic device may include, but not limited to, a mobile phone (e.g. a multifunctional mobile phone), a personal digital assistant (PDA), a portable electronic device such as a tablet, and a personal computer such as a laptop computer or desktop computer.

According to the embodiment shown in FIG. 1, a communication port of the electronic device has a functionality of obtaining power from an external power source for the electronic device, where the communication port typically comprises at least one power terminal regarding the functionality of obtaining power from the external power source for the electronic device. For example, the communication port can be a USB port whose connector, such as the USB connector 50 shown in FIG. 1, may comprise a plurality of terminals VBUS, D−, D+ and GND, where the terminal VBUS can be regarded as the aforementioned at least one power terminal, the terminals D− and D+ can be regarded as data terminals (or communication terminals) of the aforementioned communication port such as the USB port, and the terminal GND can be regarded as a ground terminal. As shown in FIG. 1, the apparatus 100 comprises a physical layer of the communication port, such as a USB physical layer 110 (labeled "USB PHY", for brevity), and the terminal VUSB is utilized for obtaining power for the USB physical layer 110. The circuitry of the USB physical layer 110 is well known in the related art, and therefore is not described in detail. In addition, the apparatus 100 further comprises a charging port detection circuit 120, a detection path switching unit D_SW, and a charger module 130, where the charger module 130 of this embodiment may comprise a controller 132 and a regulator 134.

In this embodiment, the charging port detection circuit 120 is arranged to selectively perform charging port detection, and the detection path switching unit D_SW is arranged to control electrical connection between the communication port (e.g. the USB port) and the charging port detection circuit 120. More specifically, the charging port detection circuit 120 performs the charging port detection when the detection path switching unit D_SW is turned on (i.e., close), electrically connecting the communication port to the charging port detection circuit 120. When the charging port detection is finished, the detection path switching unit D_SW is turned off (i.e., open), electrically disconnecting the communication port from the charging port detection circuit 120. The detection path switching unit D_SW can provide good isolation between the charging port detection circuit 120 and the USB physical layer circuit 110. In addition, the charger module 130 is capable of charging at least one battery of the electronic device, such as the battery 20 shown in FIG. 1, where the system power terminal SYS of the charger module 130 can be utilized for providing a system power to a system circuit (not shown in the figure) within the electronic device. Please note that the system power can be provided by the battery 20 directly in the apparatus 100. Under control of the controller 132 receiving the detection results from the charging port detection circuit 120, the regulator 134 is capable of regulating the input received from the charger input terminal CHRIN, which is electrically connected to the power terminal VBUS of the USB connector 50. For example, in a situation where the external power source is a USB charger such as an alternating current (AC)-to-direct current (DC) adaptor having a USB cable for outputting power, the output power of the AC-to-DC adaptor is received through the power terminal VBUS and is input into the charger module 130 through the charger input terminal CHRIN. In another example, in a situation where the external power source is a personal computer (PC) with a USB cable being temporarily connected between the PC and the electronic device, the output power of the PC is received through the power terminal VBUS and is input into the charger module 130 through the charger input terminal CHRIN. Additionally, the charger module 130 is capable of detecting whether the output voltage level VBAT of a battery terminal of the battery 20, such as the battery terminal BAT shown in FIG. 1, reaches a predetermined threshold value VTH1, and is capable of controlling operations according to whether the output voltage level VBAT of the battery 20 reaches the predetermined threshold value VTH1.

Typically, the regulator 134 may comply with the aforementioned Battery Charging Specifications such as Revision 1.1 or Revision 1.2 thereof, i.e. the so-called BC 1.1 or BC 1.2, for USB-compliant devices, where at least one portion of the aforementioned BC 1.1 and BC 1.2 defines the mechanisms that allow devices to distinguish the type of the USB port, and typically, it can be achieved by a handshaking sequence on D+ and D− data lines (i.e. the data lines respectively corresponding to the data terminals D+ and D−). For example, regarding aforementioned charging port detection, the charging port detection circuit 120 may comprise some hardware circuits for generating and detecting handshaking sequences (e.g. the handshaking sequence mentioned above). For the high-speed USB signaling, the D+ and D− data lines are sensitive to the trace impedance because it will affect the signal integrity. Please note that it is necessary to make the apparatus 100 be equipped with sufficient isolation between the charging port detection circuit 120 and the USB physical layer 110. In this embodiment, the detection path switching unit D_SW may be implemented with one or more analog switches to guarantee the isolation, where these analog switches may be controlled by one or more signals in the VUSB-domain, which means the power supply for the USB physical layer 110, such as a low dropout (LDO) voltage regulator electrically connected between the system power terminal SYS and the terminal VUSB of the USB physical layer 110. Therefore, according to this embodiment, the VUSB-domain needs to be enabled (e.g., turns on the power supply for the USB physical layer 110) to turn on the analog switches within the detection path switching unit D_SW before performing the aforementioned charging port detection (e.g. the voltage level of the terminal VUSB can be utilized for turning on the analog switches within the detection path switching unit D_SW). Moreover, as the voltage level of the data terminal D+ has to be raised to 0.6 Volts (V) within 1 second after USB plug-in to satisfy the dead battery provision specification, the VUSB-domain needs to be enabled before performing the aforementioned action to meet the USB battery charging specification. Based on the design consideration disclosed above, the timing of associated operations of the apparatus 100, such as the timing of enabling/disabling the VUSB-domain (e.g. the timing of turning on/off the power supply for the USB physical layer 110), the timing of turning on/off the system power (which is the signal on the system power terminal SYS), and the timing of charging port detection when the battery 20 is in a low battery condition, are properly arranged in this embodiment and some other embodiments such as those disclosed below.

First, the charger module 130 (more particularly, the controller 132) detects whether the output voltage level VBAT of the battery 20 reaches a predetermined threshold value such as the predetermined threshold value VTH1 mentioned above. The threshold value VTH1 in this embodiment is selected to be the minimum value (e.g. 2.0 V) for the output voltage level VBAT to enable the VUSB-domain. In practice, the controller 132 is capable of detecting the output voltage level VBAT of the battery 20 by using a detection circuit therein (not shown), where the detection circuit can be a comparator arranged to compare the output voltage level VBAT of the battery 20 with the predetermined threshold value VTH1.

When the output voltage level VBAT is less than the predetermined threshold value VTH1, the power supply for the USB physical layer 110 remains disabled, and the charger module 130 (more particularly, the regulator 134, under control of the controller 132) pre-charges the battery 20 with a predetermined pre-charging current level to make the output voltage level VBAT reach the predetermined threshold value VTH1. The pre-charging current level is less than a charging current level utilized in the current-control charging phase and is determined based on the battery characteristics. For example, the pre-charging current level may be a low charging current level such as 100 milliampere (mA), and the charging current level utilized in the current-control charging phase may be 500 mA. Then, the output voltage level VBAT is pre-charged to the predetermined threshold value VTH1, enabling the VUSB-domain, which in turns turning on the detection path switching unit D_SW to electrically connect at least one data terminal of the communication port (e.g. the data terminals D+ and D−) to the charging port detection circuit 120, allowing the charging port detection circuit 120 to perform the charging port detection on the aforementioned at least one data terminal (e.g. the data terminals D+ and D−).

According to this embodiment, in a situation where the output voltage level VBAT is less than the predetermined threshold value, the detection path switching unit D_SW is controlled to prevent the aforementioned at least one data terminal of the communication port (e.g. the data terminals D+ and D−) from being electrically connected to the charging port detection circuit 120. In addition, in a situation where the battery 20 is pre-charged with the predetermined pre-charging current level, the apparatus 100 is capable of utilizing the output voltage level VBAT reaching the predetermined threshold value VTH1 as the power source of the aforementioned physical layer such as the USB physical layer 110. For example, with the aid of the LDO voltage regulator disclosed above, the USB physical layer 110 is capable of obtaining power from the output voltage level VBAT reaching the predetermined threshold value VTH1.

Figure 2:
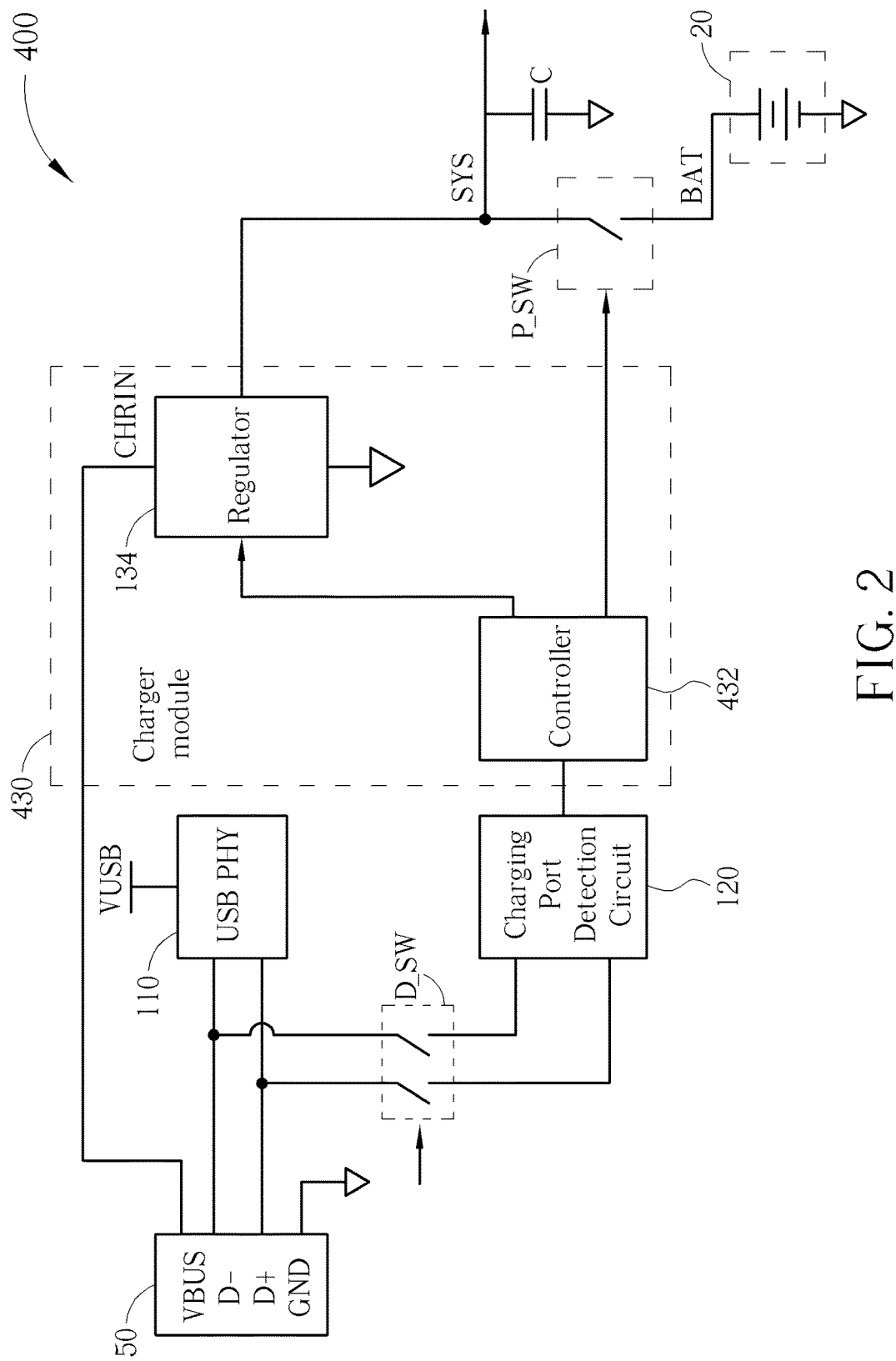
FIG. 2 is a diagram of an apparatus for performing charging port detection control according to another embodiment of the present invention.

FIG. 2 is a diagram of an apparatus 400 for performing charging port detection control according to another embodiment of the present invention, where the apparatus 400 may comprise at least one portion (e.g. a portion or all) of the aforementioned electronic device. In comparison with the apparatus 100 shown in FIG. 1, a power path switching unit P_SW is installed on the power path between the system power terminal SYS and a battery terminal of the battery 20, such as the battery terminal BAT shown in FIG. 2, where the power path switching unit P_SW of the electronic device is arranged to control electrical connection between the system circuit (not shown) of the electronic device and the battery 20 of the electronic device. In response to the change in architecture, the controller 432 of this embodiment is capable of controlling the power path switching unit P_SW and controlling associated operations.

According to this embodiment, in a situation where the electronic device is equipped with the power path switching unit P_SW on the aforementioned power path, the charger module 430 is capable of providing the system circuit with the system power directly when the battery 20 is in the low battery condition. More particularly, when the battery 20 is in the low battery condition, the controller 432 may completely or partially turn off (i.e. open) the power path switching unit P_SW to disconnect the battery 20 from the system power terminal SYS of the charger module 130, in order to prevent the system power level (i.e. the voltage level of the system power output from the system power terminal SYS) from being pulled down by the battery 20 and prevent the battery 20 from obtaining power from the regulator 134 in the low battery condition.

For performing charging port detection control, the charger module 430 (more particularly, the controller 432) first detects whether the output voltage level VBAT of the battery 20 is high enough. In practice, the controller 432 is capable of detecting the output voltage level VBAT of the battery 20 by using the detection circuit mentioned in disclosure of FIG. 1, where the detection circuit can be the aforementioned comparator arranged to compare the output voltage level VBAT of the battery 20 with the predetermined threshold value VTH1 (e.g. 2.0 V).

Based upon the detection result, the controller 432 selectively turns off (completely or partially) the power path switching unit P_SW to de-couple the system power terminal SYS from the battery 20 and the regulator 134 regulates the system voltage at the system power terminal SYS to be at a voltage level X between a second predetermined threshold value VTH2 and a third predetermined threshold value VTH3, allowing the charging port detection circuit 120 of the electronic device to perform the aforementioned charging port detection on the aforementioned at least one data terminal of the communication port (e.g. the data terminals D+ and D−). The second predetermined threshold value VTH2 may be approximately equal to the first predetermined threshold value VTH1 and be smaller than the third predetermined threshold value VTH3. In this embodiment, the second predetermined threshold value VTH2 represents a minimum possible value for the system voltage to make the aforementioned physical layer such as the USB physical layer 110 be turned on (or make the power supply for the USB physical layer 110 enabled), and the third predetermined threshold value VTH3 represents a maximum possible value of the system voltage that prevents the system circuit from being turned on (or enabled). In practice, the first predetermined threshold value VTH1 (e.g. 2.0 V) can be taken as an example of the second predetermined threshold value VTH2, and another predetermined threshold value SYS_UVLO (e.g. 3.2 V) can be taken as an example of the third predetermined threshold value VTH3. When the system voltage is regulated to the voltage level X, the USB physical layer 110 is turned on and the detection path switching unit D_SW electrically connects the data terminal (e,g, D+/D−) to the charging port detection circuit 120 to perform the charging port detection. Therefore, the power supply for the physical layer circuit 110 is enabled but the system circuit is not enabled during the charging port detection. This can guarantee that the electronic device complies with the battery charging specification since only a small current is allowed to be drawn from the charger input CHRIN during the charging port detection.

In addition, when the detection result indicates that the output voltage level VBAT is not less than the predetermined threshold value VTH1, the controller 432 completely or partially turns on the power path switching unit P_SW (i.e. couple the system power terminal SYS to the battery 20) to make the system obtain power from the battery 20. The system voltage provides power to the power terminal VUSB of the USB physical layer 110, turns on the detection path switching unit D_SW, and then the charging port detection circuit 120 performs the charging port detection on the aforementioned at least one data terminal of the communication port (e.g. the data terminals D+ and D−). Please note that the regulator 134 may be disabled in this situation.

Figure 3:
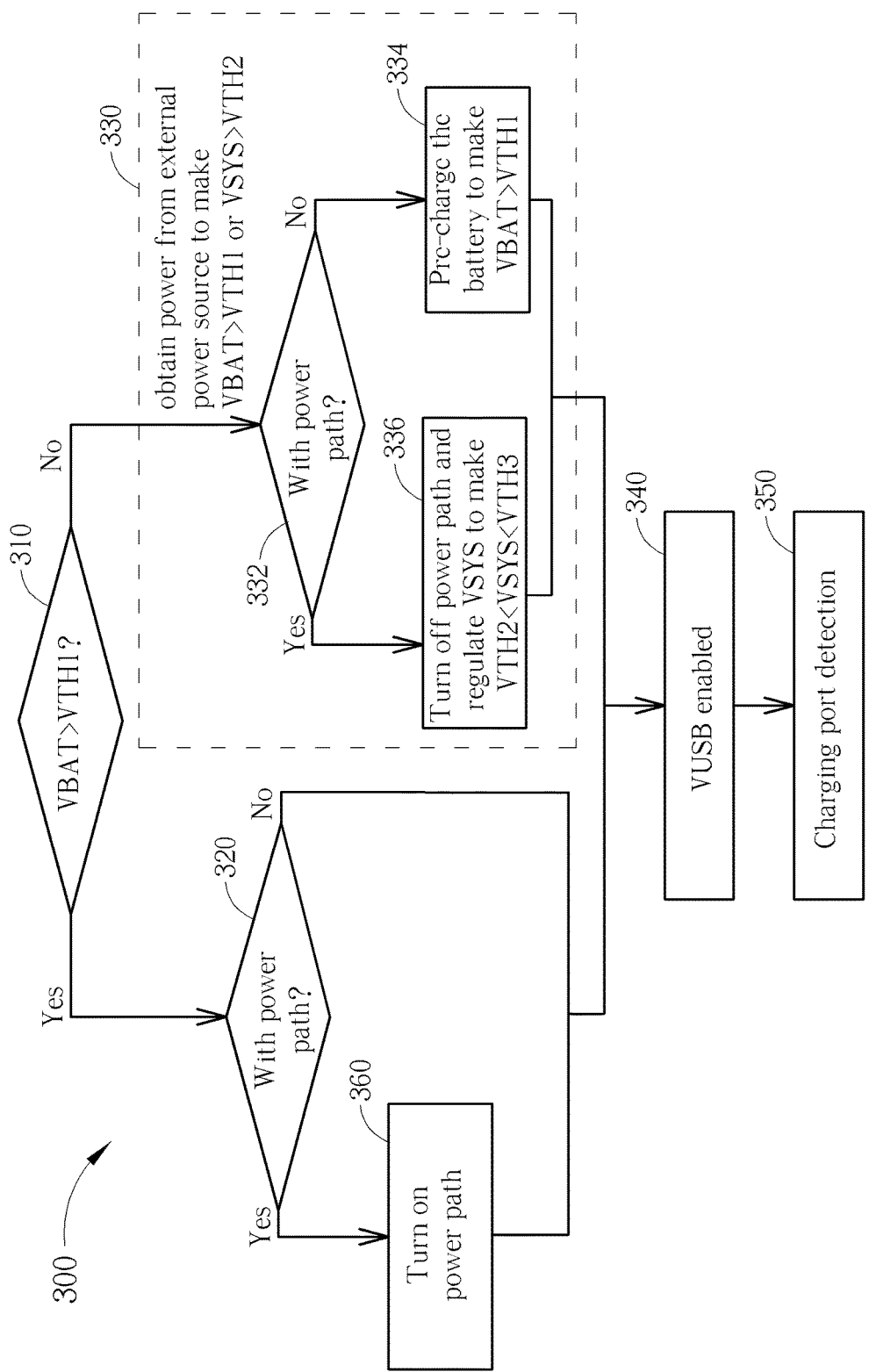
FIG. 3 illustrates a working flow involved with the apparatus shown in FIG. 1 and the apparatus shown in FIG. 2 according to an embodiment of the present invention.

FIG. 3 shows a working flow 300 involved with the apparatus 100 and the apparatus 400 according to an embodiment of the present invention. However, a skilled person should appreciate that, depending on different circuit configurations, some steps in the working flow 300 may be omitted or modified without disobeying the spirits of the present invention; for example, the working flow 300 may be modified to be involved with the apparatus 100 or the apparatus 400 only.

After an external power source such as a USB charger is plugged in, in Step 310, the charger module 130/430 (more particularly, the controller 132/432) detects whether the output voltage level VBAT of the battery 20 reaches the first predetermined threshold value VTH1 (e.g. 2.0 V for enabling the VUSB-domain). When it is detected that the output voltage level VBAT of the battery 20 is greater than the first predetermined threshold value VTH1 (i.e. it is detected that the output voltage level VBAT of the battery 20 is high enough), Step 320 is entered; otherwise (i.e. it is detected that the output voltage level VBAT of the battery 20 is low), Step 330 is entered.

In Step 330, the charger module 130/430 obtains power from the external power source to make the output voltage level VBAT reach the first predetermined threshold value VTH1 or to make the system voltage at the system power terminal SYS be larger than the second predetermined threshold value VTH2. Note that the first predetermined threshold value VTH1 may be approximately equal to the second predetermined threshold value VTH2 but is not limited thereto. The selection of VTH1 and VTH2 may depend on the circuit designs.

Step 330 may comprise Step 332-336: in the case that the battery 20 provides the system power directly, that is, the power path switching unit P_SW is not installed, such as the apparatus 100 shown in FIG. 1, the charger module 130 (more particularly, the regulator 134, under control of the controller 132) pre-charges the battery 20 with the predetermined pre-charging current level, with a small current such as 100 mA, to make the output voltage level VBAT reach the first predetermined threshold value VTH1. Please note that, during the pre-charging operation, the VUSB-domain keeps disabled (e.g. the power supply for the USB physical layer circuit 110 keeps turned off) since the system power level is too low to sustain the operation of the VUSB-domain. In the meanwhile, under control of the controller 132, the regulator 134 operates in the pre-charge mode thereof.

When the battery is pre-charged to the predetermined level (Step 340), the VUSB-domain (e.g. the power supply for the USB physical layer circuit 110) is enabled. In one embodiment, the power supply for the USB physical layer circuit 110 is generated by a LDO converting the battery voltage. Then, in Step 350, the detection path switching unit D_SW connects at least one data terminal of the communication port (e.g. the data terminals D+ and D−) to the charging port detection circuit 120, allowing the charging port detection circuit 120 to perform the aforementioned charging port detection, where the BC 1.2 detection can be taken as an example of the charging port detection. In one embodiment, the detection path switching unit D_SW comprises Metal Oxide Semiconductor Field Effect Transistors (MOSFETs) whose gate terminals are controlled according to the VUSB-domain, and are therefore turned on when the VUSB-domain is enabled. Please note that, during the charging port detection, the system may be turned on or turned off, depending on whether the output voltage level VBAT of the battery 20 is high enough.

In the case that the charger module provides the system power directly when the battery voltage VBAT is low, that is, the power path switching unit P_SW is installed, such as the apparatus 400 shown in FIG. 2 (Step 336), the charger module 430 (more particularly, the controller 432) partially or completely de-couples the battery 20 from the system power terminal SYS by turning off the power path switching unit P_SW to decrease or prevent the battery 20 from obtaining power from the charger module 430. The charger module 430 further (more particularly, the regulator 134, under control of the controller 432) regulates the system voltage at the system power terminal SYS of the system circuit to be at a voltage level X between the second predetermined threshold value VTH2 and the third predetermined threshold value VTH3. In one embodiment, the second predetermined threshold value VTH2 and the third predetermined threshold value VTH3 represent the minimum value for the system voltage to enable VUSB-domain such as 2.0 V and the maximum value (SYS_UVLO) to prevent the system circuit from being enabled such as 3.2 V, respectively. The voltage level X can be a voltage level whose value falls within the range of the interval (2.0, 3.2), such as 2.5V.

After the system voltage is properly regulated, the flow enters Step 340 and Step 350. In Step 340, the VUSB-domain (e.g. the power supply for the USB physical layer 110) is enabled. In one embodiment, the power supply for the USB physical layer 110 is generated by a LDO converting the system voltage. In Step 350, the detection path switching unit D_SW is turned on, and the charging port detection circuit 120 performs the aforementioned charging port detection, where the BC 1.2 detection can be taken as an example of the charging port detection. Please note that, during the charging port detection, the system circuit keeps turned off since the system voltage is regulated to be less than SYS_UVLO. The system voltage VSYS is powered by the regulator 134 now (rather than being affected or powered by the battery 20) before the charging port detection is completed, where the current drawn from the regulator 134 should be less than 100 mA.

However, when it is detected that the output voltage VBAT of the battery 20 is not less than the first predetermined threshold value VTH1, Step 320 is entered. In the case that the battery 20 provides the system power directly, that is, the power path switching unit P_SW is not included, such as the apparatus 100 shown in FIG. 1, Step 340 is entered. The output voltage VBAT is high enough to enable the VUSB domain, and then the charging port detection is performed in step 350. The system circuit may be enabled or disabled in this situation, depending on the level of the battery output voltage VBAT.

In another case where the power path switching unit P_SW is included, such as the apparatus 400 shown in FIG. 2, Step 360 is entered. The controller 432 turns on (completely or partially) the power path switching unit P_SW to couple the system power terminal SYS to the battery 20 and let the battery 20 supply the system power. The regulator may be disabled to guarantee that the electronic device complies with the battery charging specification. As the system voltage is high enough, the VUSB domain is enabled (step 340), turning on the detection path switching unit D_SW to connect at least one data terminal of the communication port (e.g. the data terminals D+ and D−) to the charging port detection circuit 120. The charging port detection circuit 120 then performs the aforementioned charging port detection (step 350). The system circuit may be turned on or off, depending on the level of the battery output voltage VBAT.

It is an advantage of the present invention that the present invention method and apparatus can provide an adequate startup flow to comply with BC 1.1 or BC 1.2 specifications, for the system with or without power path management (e.g. the apparatus 400 or the apparatus 100, respectively). In addition, the adequate startup flow for the charger module which complies with BC1.1 or BC1.2 specifications is suitable for various kinds of battery powered systems, where a traditional battery powered system can be altered with ease based upon the embodiments disclosed above, to prevent the related art problems. Additionally, the adequate startup flow for the charger module which complies with BC1.1 or BC1.2 specifications is suitable for various kinds of battery powered systems to perform power path management.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method applied to an electronic device comprising a USB physical layer circuit, the method comprising:
    enabling a power supply such that the power supply provides power to the USB physical layer circuit before enabling a connection between a detection circuit and a USB port of the electronic device; and
    after enabling the power supply such that the power supply provides power to the USB physical layer circuit, identifying a type of the USB port of the electronic device by a handshaking sequence on at least one data line of the USB port.

2. The method of claim 1, wherein the USB port is configured to obtain power from an external power source for the electronic device, and the method comprises the steps of:
    detecting whether an output voltage level of a battery of the electronic device reaches a first predetermined threshold value; and
    when it is detected that the output voltage level of the battery is less than the first predetermined threshold value, obtaining power from the external power source through a charger module of the electronic device to make the output voltage level of the battery reach the first predetermined threshold value or to make a system voltage of the electronic device be larger than a second predetermined threshold value, and enabling the power supply and identifying the type of the USB port of the electronic device after enabling the power supply then performing the charging port detection on the communication port, wherein the system voltage corresponds to a system power terminal providing a system.

3. The method of claim 2, wherein the step of obtaining power from the external power source through the charger module of the electronic device to make the output voltage level of the battery reach the first predetermined threshold value or to make the system voltage of the electronic device be larger than the second predetermined threshold value comprises:
    pre-charging the battery with a pre-charging current to make the output voltage level of the battery reach the first predetermined threshold value when the system voltage is provided by the battery, wherein a level of the pre-charging current is less than a level of a charging current utilized in a current-control charging phase for the battery.

4. The method of claim 2, wherein the step of obtaining power from the external power source through the charger module of the electronic device to make the output voltage level of the battery reach the first predetermined threshold value or to make the system voltage of the electronic device be larger than the second predetermined threshold value comprises:
regulating the system voltage by the charger module to fall between the second predetermined threshold value and a third predetermined threshold value when the system voltage is provided by the charger module.

5. The method of claim 4, further comprising:
de-coupling the system power terminal from the battery to prevent the battery from obtaining power from the charger module.

6. The method of claim 5, wherein the step of de-coupling the system power terminal from the battery comprises:
turning off a power path switching unit of the electronic device, wherein the power path switching unit is arranged to control electrical connection between the system power terminal and the battery.

7. The method of claim 4, wherein the second predetermined threshold value is approximately equal to the first predetermined threshold value and is smaller than the third predetermined threshold value.

8. The method of claim 4, wherein the second predetermined threshold value represents a minimum value of the system voltage to enable the power supply for supplying the USB physical layer circuit, and the third predetermined threshold value represents a maximum value of the system voltage that prevents the system circuit from being enabled.

9. The method of claim 4, wherein the system circuit is not enabled during the identifying the type of the USB port.

10. The method of claim 2, further comprising:
when it is detected that the output voltage level of the battery is not less than the first predetermined threshold value, coupling the battery to the system power terminal and performing the identifying of the type of the USB port the charging port detection on the communication port.

11. The method of claim 10, wherein the step of coupling the battery to the system power terminal comprises:
turning on a power path switching unit of the electronic device, wherein the power path switching unit is arranged to control electrical connection between the system power terminal and the battery.

12. The method of claim 1, wherein the power supply is not enabled when an output voltage level of a battery of the electronic device is less than a first predetermined threshold value.

13. The method of claim 1, wherein the step of identifying the type of the USB port:
controlling a detection path switching unit to electrically connect the at least one data terminal line of the USB port to a detection circuit, allowing the detection circuit to identify the type of the USB port by a handshaking sequence on the at least one date line of the USB port.

14. An apparatus comprising:
a detection circuit arranged to identify a type of a USB port by a handshaking sequence on at least one data line of the USB port, wherein the USB port is configured to obtain power from an external power source for an electronic device;
a detection path switching unit arranged to control electrical connection between the USB port and the detection circuit; and
a USB physical layer circuit, wherein the apparatus enables a power supply such that the power supply provides power to the USB physical layer circuit before enabling the detection path switching unit to connect the detection circuit to the USB port.

15. The apparatus of claim 14, further comprising:
a charger module arranged to detect whether an output voltage level of a battery of the electronic device reaches a first predetermined threshold value,
wherein when it is detected that the output voltage level is less than the first predetermined threshold value, the charger module obtains power from the external power source to make the output voltage level reach the first predetermined threshold value or to make a system voltage of the electronic device be larger than a second predetermined threshold value, and the apparatus enables the power supply and then the detection path switching unit electrically connects the at least one data line of the USB port to the detection circuit wherein the system voltage corresponds to a system power terminal providing a system power to a system circuit of the electronic device.

16. The apparatus of claim 15, wherein when it is detected that the output voltage level is not less than the first predetermined threshold value, the charger module turns on a power path switching unit to couple the system power terminal to the battery, and then the detection path switching unit electrically connects at least one data line of the USB port to the detection circuit, wherein the power path switching unit is arranged to control electrical connection between the system power terminal and the battery.

17. The apparatus of claim 15, wherein in a situation where the system voltage is provided by the battery, the charger module pre-charges the battery with a pre-charging current to make the output voltage level reach the first predetermined threshold value, wherein a level of the pre-charging current is less than a level of a charging current utilized in a current-control charging phase for the battery.

18. The apparatus of claim 15, wherein in a situation where the system voltage is provided by the charger module, the charger module regulates the system voltage to be at a voltage level between the second predetermined threshold value and a third predetermined threshold value; wherein the second predetermined threshold value represents a minimum value of the system voltage to enable the power supply for supplying the USB physical layer circuit of the electronic device, and the third predetermined threshold value represents a maximum value of the system voltage that prevents the system circuit from being enabled.

19. The apparatus of claim 18, wherein the charger module further turns off a power path switching unit to de-couple the system power terminal from the battery, wherein the power path switching unit is arranged to control electrical connection between the system power terminal and the battery.

20. The apparatus of claim 14, wherein in a situation where an output voltage level of a battery of the electronic device is less than a first predetermined threshold value, the power supply is not enabled.

* * * * *